(12) United States Patent
Kritt et al.

(10) Patent No.: US 8,832,082 B2
(45) Date of Patent: Sep. 9, 2014

(54) PRESENTATION OF SEARCH RESULTS WITH DIAGRAMS

(71) Applicant: International Business Machines Corporation, Armonk, NY (US)

(72) Inventors: Barry A Kritt, Raleigh, NC (US); Sarbajit K Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/781,639

(22) Filed: Feb. 28, 2013

(65) Prior Publication Data

US 2013/0325835 A1 Dec. 5, 2013

Related U.S. Application Data

(63) Continuation of application No. 13/482,840, filed on May 29, 2012.

(51) Int. Cl.
*G06F 17/30* (2006.01)

(52) U.S. Cl.
USPC .................................................. 707/722

(58) Field of Classification Search
None
See application file for complete search history.

(56) References Cited

U.S. PATENT DOCUMENTS

| 6,567,103 | B1 | 5/2003 | Chaudhry |
| 2001/0047290 | A1 | 11/2001 | Petras et al. |
| 2008/0091670 | A1 | 4/2008 | Ismalon |
| 2008/0222103 | A1 | 9/2008 | Zhang et al. |
| 2010/0312793 | A1 | 12/2010 | Brown et al. |
| 2012/0005198 | A1 | 1/2012 | Pontier et al. |

OTHER PUBLICATIONS

Chau, Visualizing Web Search Results Using Glyphs: Design and Evaluation of a Flower Metaphor, Mar. 2011, pp. 1-27.*
U.S. Appl. No. 13/482,840, Office Action, Nov. 12, 2013.
Anette Hulth et al., Automatic Keyboard Extraction Using Domain Knowledge, 2001, 2 pages, Computational Linguistics and Intelligent Text Processing, vol. 2004/2001, http://www.springerlink.com/content/m20av0yumkmgetla.
Murray Nicholson, Internet Research Techniques, Feb. 20, 2012, 5 pages, http://www.deerford.com/research/searchtechniques.htm.
Ramesh Nallapati et al., Extraction of Key Words from News Stories, 6 pages, Center for Intelligent Information retrieval Department of Computer Science, University of Massachusetts, Amherst, MA.

* cited by examiner

*Primary Examiner* — Alex Gofman
(74) *Attorney, Agent, or Firm* — Kunzler Law Group; Steven L. Bennett

(57) ABSTRACT

Methods provide presentation of a plurality of search results and a diagram for each of the plurality of search results. The methods are carried out with computer readable program code, when read by a processor, that is configured for receiving a plurality of search results in response to a search request and accessing a database including signifier data for each of the plurality of search results. The signifier data may include information regarding at least a first signifier and a second signifier of each of the plurality of the search results. The methods may further include generating a first diagram of the first and second signifiers for each of the plurality of search results, the first diagram based at least in part on the signifier data, and presenting the plurality of search results and the first diagram for each of the plurality of search results via a browser application.

22 Claims, 7 Drawing Sheets

PRESENTATION OF SEARCH RESULTS WITH DIAGRAMS

CROSS-REFERENCE TO RELATED APPLICATION

This application is a continuation of U.S. patent application Ser. No. 13/482,840, filed May 29, 2012, which is incorporated herein by reference in its entirety for all purposes.

BACKGROUND

The present invention relates to generally to presentation of computerized search result information, and more specifically, to presentation of a plurality of search results and a diagram for each of the plurality of search results.

Corporate networks, intranets, the Internet, and the World Wide Web contain large amounts of information. Typically, users search these resources for documents, either for work, educational research, learning, or for leisurely reading. For example, with the assistance of Internet search engines, computer users can connect to computer systems located around the globe and read information on web pages, look up phone numbers, search through and read digitized books and magazines from libraries, read online news reports, search and read through blogs, and shop for almost anything.

BRIEF SUMMARY

According to one embodiment of the present invention, a method, implemented in a computer system, of presentation of a plurality of search results and a diagram for each of the plurality of search results is provided. The method may include receiving a plurality of search results in response to a search request and accessing a database including signifier data for each of the plurality of search results. The signifier data may include information regarding at least a first signifier and a second signifier of each of the plurality of the search results. The method may further include generating a first diagram of the first and second signifiers for each of the plurality of search results, the first diagram based at least in part on the signifier data, and presenting the plurality of search results and the first diagram for each of the plurality of search results via a browser application.

In some embodiments of the present invention, the search request may include at least a first search term and one of the first and second signifiers may include the first search term. Additionally and/or alternatively, each of the plurality of search results may include at least a first keyword and the other one of the first and second signifiers may include the first keyword. Additionally and/or alternatively, the plurality of search results may be generated by a search engine, and the signifier database may be stored at a search engine server. Additionally and/or alternatively, the signifier data may include a distribution of the first signifier and a distribution of the second signifier in the search result.

In some embodiments of the present invention, the method may further include receiving an indication to increase or decrease the number of signifiers depicted in the first diagram. Additionally and/or alternatively, in some embodiments of the present invention, the method may further include generating a second diagram for each of the plurality of search results, receiving an indication to display the second diagram and presenting the plurality of search results and the second diagram for each of the plurality of search results via the browser application.

According to another embodiment of the present invention, a method, implemented in a computer system, of presentation of a plurality of search results and a diagram for each of the plurality of search results is provided. The method may include receiving a plurality of search results in response to a search request, each of the plurality of search results including at least a first signifier and a second signifier, and generating a first diagram of the first signifier and the second signifier for each of the plurality of search results. The first diagram may include at least a first dimension and/or the first dimension may be based at least in part on a distribution of the first signifier and a distribution of the second signifier within the search result. The method may further include presenting the plurality of search results and the first diagram for each of the plurality of search results via a browser application.

In some embodiments of the present invention, the first diagram may include a second dimension, the second dimension based at least in part on a frequency of the first signifier and a frequency of the second signifier in the search result. Additionally and/or alternatively, the first diagram may include a first icon, the size of the first icon may be based at least in part on the frequency of the first signifier in the search result, and a second icon, the size of the second icon may be based at least in part on the frequency of the second signifier in the search result. Additionally and/or alternatively, the first diagram may include a bond indicator to illustrate a bond strength between the first and second signifiers, the bond strength may be based at least in part on the distribution of the first signifier in the search result with respect to the distribution of the second signifier in the search result. Additionally and/or alternatively, each of the plurality of search results may include at least a first keyword, and one of the first and second signifiers may include the first keyword. Additionally and/or alternatively, the search request may be based at least in part on a first search term, and one of the first signifier and the second signifier may include the first search term.

In some embodiments of the present invention, the method may further include receiving an indication to increase or decrease the number of signifiers in the first diagram. Additionally and/or alternatively, the method may include receiving an indication to display a second diagram and presenting the plurality of search results and the second diagram for each of the plurality of search results via the browser application.

DETAILED DESCRIPTION

Figure 1:
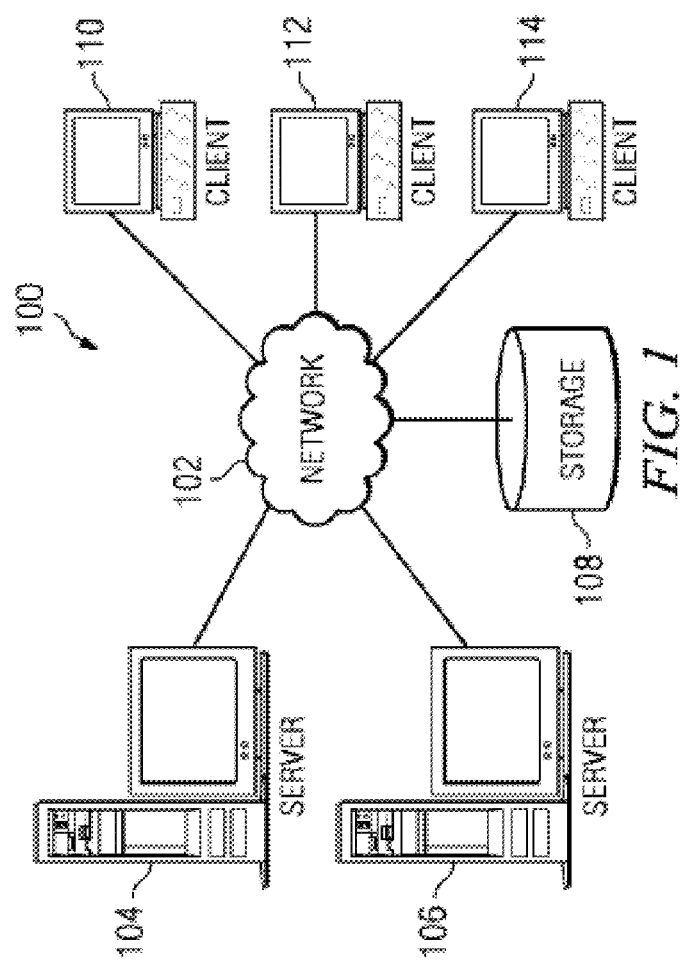
FIG. 1 is a pictorial representation of an example of a computer system in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF cable, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
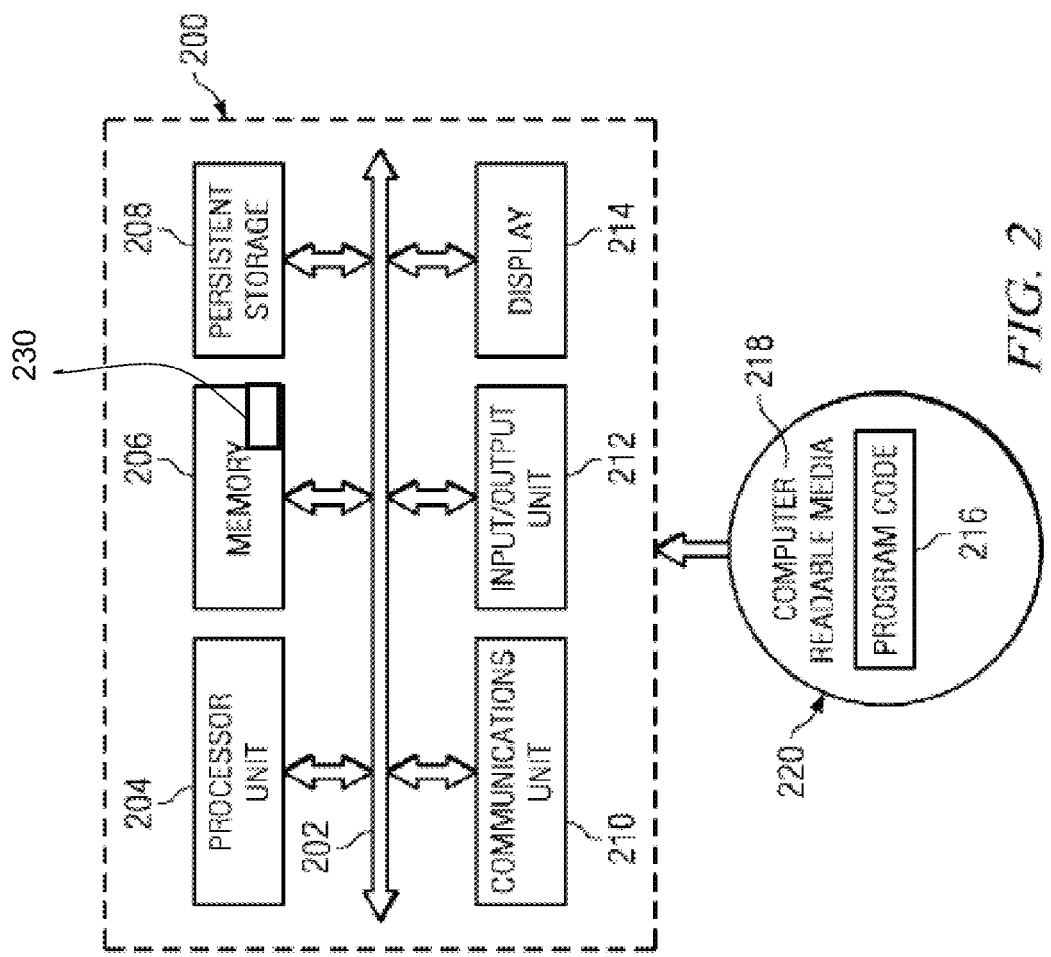
FIG. 2 is a block diagram of an example of a computer in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a computer system, indicated generally at 100, and including a network of computers in which illustrative embodiments may be implemented. Computer system 100 may contain a network 102, which is the medium used to provide communications links between various devices and computers connected together within computer system 100. Network 102 may include connections, such as wire, wireless communication links, or fiber optic cables.

In the depicted example, a server 104 and a server 106 may connect to network 102 along with a storage unit 108. In addition, a first client computer 110, a second client computer 112, and a third client computer 114 may connect to network 102. Client computers 110, 112, and 114 may be, for example, personal computers or network computers. In the depicted example, server 104 may provide data, such as boot files, operating system images, and/or software applications to client computers 110, 112, and 114. Client computers 110, 112, and 114 are clients to server 104 in this example. Computer system 100 may include additional servers, clients, and other devices not shown, or may include fewer devices than those shown.

In the depicted example, network 102 may be or may include the Internet. Computer system 100 also may be implemented with a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer or a computer system, such as a server, a client computer, a gaming system, a personal digital assistant (pda), a smart phone, a mobile device or any other computer or device that functions like a computer, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 may serve to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device may include any piece of hardware that is capable of storing information either on a temporary basis and/or a permanent basis. Memory 206 may include, for example, a random access memory or any other suitable volatile or non-volatile storage device. Persistent storage 208 may take various forms depending on the particular implementation. For example, persistent storage 208 may contain one or more components or devices. For example, persistent storage 208 may include a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210 may provide for communications with other data processing systems or devices and/or one or more networks such as a local area network (LAN), a general wide area network (WAN), and/or a public network (e.g., the Internet). Some embodiments of communications unit 210 may include a network interface card. Communications unit 210 may provide communications through the use of either or both physical and wireless communications links.

Input/output unit 212 may allow for input and output of data with other devices that may be connected to data processing system 200. For example, input/output unit 212 may provide a connection for user input through a keyboard and mouse. Further, input/output unit 212 may send output to a printer. Display 214 may provide a mechanism to display information to a user. Display 214 may include a touch screen 215.

Instructions for the operating system and applications or programs may be located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 may be located in a functional form on computer-readable media 218 that is selectively removable and may be loaded onto or transferred to data processing system 200 for execution by processor unit 204. Program code 216 and computer-readable media 218 may form computer program product 220. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 may include hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. The bus system may be implemented using any suitable type of architecture that provides for a transfer of data between different components or devices attached to the bus system. Additionally, a communications unit may include one or more devices used to transmit and receive data, such as a modem or a network adapter. Further, a memory may include, for example, memory 206 or a cache such as found in an interface and memory controller hub that maybe present in communications fabric 202.

A computer or computer system, such as those depicted in FIGS. 1 and 2, may provide a method and/or a system of presentation of a plurality of search results and a diagram for each of the plurality of search results. In many of the following paragraphs, numerous embodiments are discussed using the terms "search", also referred to herein as a "query". The meaning of the term "search" and/or "search request" includes to "interrogate a collection of data or information" such as records in a database. However, search request may additionally and/or alternatively mean "search a single file or collection of files", such as hypertext markup language (HTML) files or documents on the Web. A search term may include a specific word or string of words which are entered in a search request in order to retrieve information.

A search request may generate one or more search results. A "search result" may include a document that matches the search request criteria, or search terms. A "document," as the term is used herein, may be broadly interpreted and include any machine-readable and machine-storable work product. A document may include a file, a combination of files, a web page (such as an HTML file), a portable document format (PDF) file, an e-mail, a text file, a rich text format (RTF) file, a postscript (PS) file, one or more files with embedded links to other files, a forum page of text and graphics, a posting to a forum, a blog, an electronic version of printed text, and a digital picture (JPEG, GIF, BMP), only to name a few. As those skilled in the art will recognize there are hundreds of different types of files, each of which may be considered a document as the term is used herein. In the context of the Internet, common documents are web pages. Documents often include textual information and may include embedded information (such as meta information, images, hyperlinks, etc.) and/or embedded instructions (such as Javascript, ActiveX, etc.). A "hyperlink" or simply a "link," as the term is used herein, is to be broadly interpreted to include any reference to/from a document from/to another document, or another part of the same document.

Typically, documents are a function of keywords. A keyword may include one or more words identified as such by any means known to those skilled in the art, including but not limited to keyword extraction logic, manually assigned keywords, frequency analysis and/or any other means. In some embodiments, a keyword may capture an essence of a topic of a document. Additionally, and/or alternatively, a keyword may include a significant word or phrase relevant to the document in question.

A "signifier" of a document may include a keyword of the document and/or a search term used to retrieve the document. Signifier data may include information regarding the signifier with respect to the document. For example, signifier data may include the frequency of the signifier in the document, in other words the number of times the signifier occurs in the document. Signifier data may further include a distribution of the signifier in the document. In other words, signifier data may include information of at what points along a length of a document the signifier occurs.

Signifier data may include a semantic relationship among the signifiers. The semantic relationship may be identified base on one or more text mining methods, e.g. Association rule, decision tree etc. Additionally and/or alternatively, signifier data may include a bond strength among signifiers in the document, for example a bond strength between a first signifier of the document and a second signifier of the document. The bond strength may be based at least in part on the distribution of the first signifier in the document with respect to the distribution of the second signifier in the document. For example, a first signifier that occurs adjacent to a second signifier and distal to a third signifier may have a greater bond strength with the second signifier than with the third signifier. Adjacent to may include occurrence within the same section, paragraph, or sentence of a document.

A diagram may be used to visually illustrate signifier data of the search result at issue. A diagram may include any diagram, chart, graph and/or any other visual presentation of information known to those skilled in the art. A diagram may include one or more dimensions.

Computers, corporate networks, intranets, the Internet, and the World Wide Web contain large amounts of searchable documents. The documents may be stored and/or indexed in a database, for example a service provider server or database. The database may be searched by any means known to those skilled in the art, including but not limited to a search engine.

For example, to locate documents on the Internet, users frequently use an Internet search engine. Internet users typically enter one or more search terms, which may include Boolean operators, into a user interface of a search engine and transmit the search request to a network of servers running the search engine.

The several different computing devices in system 100 may comprise several different computing devices which may be involved with generating search results for a browser or search application, such as the browser/search application 230 (FIG. 2). For example, system 100 may allow a person to enter query or search terms into a search engine on the Internet and produce a list or results.

Server 104, 106 may include a search engine application, which may generate search results for user search requests, such as users of computer 110, 112, 114. For example, a person using computer 110, 112, 114 may generate a search request via a graphical user interface (GUI) form generated by Server 104, 106. Server 104, 106 may receive the search request, perform a search operation via a search engine, and provide a plurality of search results (i.e. a plurality of documents matching the search criteria) to computer 110, 112, 114. In other embodiments, the search engine may comprise different applications that generate search results in different ways. For example, the application may include a web page server, a forum or blog server, a file transfer protocol (FTP) server, a gopher server, or a telnet server, as examples. In other words, applications of server 104, 106 may receive varying types of search requests and generate differing types of search results for the other computers of system 100 in alternative embodiments. As a person skilled in the art will quickly appreciate, system 100 may comprise numerous communication and networking configurations, with almost unlimited combinations of local and remote search and/or query applications.

In one or more embodiments, a computer, such as computer 200, may have a processor, such as processor 204, for executing program instructions of the various applications that may be in memory 206, such as search application 230. Search application 230 may vary from embodiment to embodiment. For example, in one embodiment, search application 230 may comprise an Internet browser application. In an alternative embodiment, search application 230 may comprise a database query application, accessing and searching a database, for example a database of server 104, 106, for database matches. Browser and database applications are just two examples, with all other types of search applications known those skilled in the art being possible in alternative embodiments.

A system may display data of search results on a monitor or other computer display, such as display 214. Using input device 214, the user of computer 200 may enter various search terms, which may include Boolean operators or logical text operators, when requesting a search. For example, input device 212 may comprise a keyboard arid/or a mouse. In some embodiments input device 212 may comprise a tablet and stylus, such as a pressure-sensitive or capacitance-sensitive surface of a PDA that recognizes hand-written characters. In even further embodiments input device 212 may comprise an audible input device, such as a microphone used for speech recognition.

A user of computer 200 (or 110, 112, 114) may connect to the Internet via search application 230 and initiate a search session with the search engine application of server 104, 106.

Upon entering several search terms into a GUI search request screen, the user may send the search request to computer 104, 106. Computer 104, 106 may receive the search request, perform a search using the search terms via the search engine application, and send the plurality of search results of the search back to computer 200 (or 110, 112, 114) and search application 230.

Each of the plurality of search results may include a number of signifiers, including at least a first signifier and a second signifier. The first and/or second signifiers may include a keyword of the search result and/or a search term used to identify the search result. Any of the computers shown in system 100 may include a database including signifier data for each of the plurality of search results, the signifier data including information regarding at least the first signifier and the second signifier of each of the plurality of the search results. Based at least in part on the signifier data of the first and second signifiers, a diagram may be generated for each of the plurality of search results. The diagram may visually convey the content of the search result being illustrated by visually illustrating the signifier data.

Figure 3:
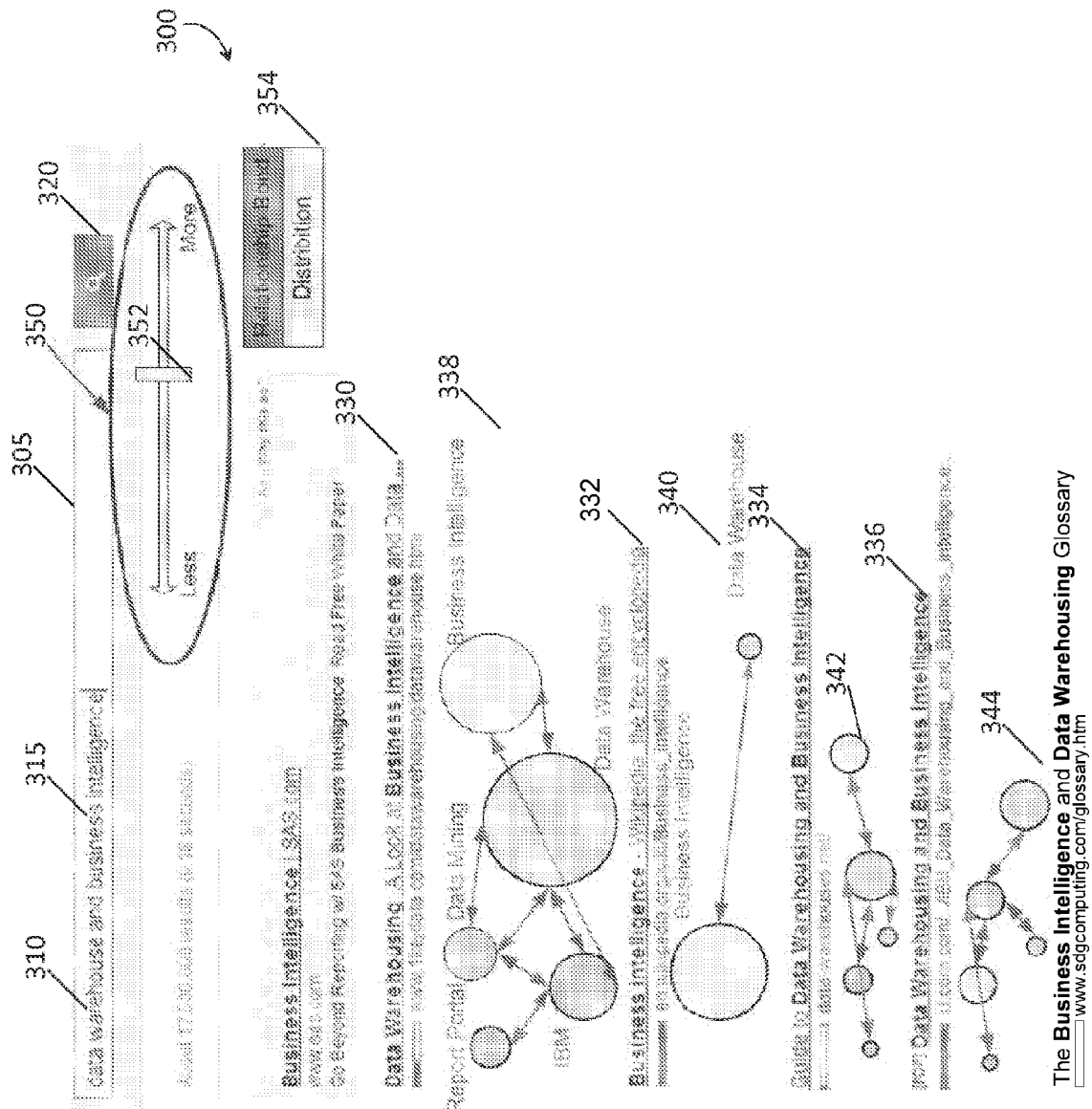
FIG. 3 is a pictorial representation of an example list of search results and respective first diagrams that a user may see in response to entering a search request.
Figure 4:
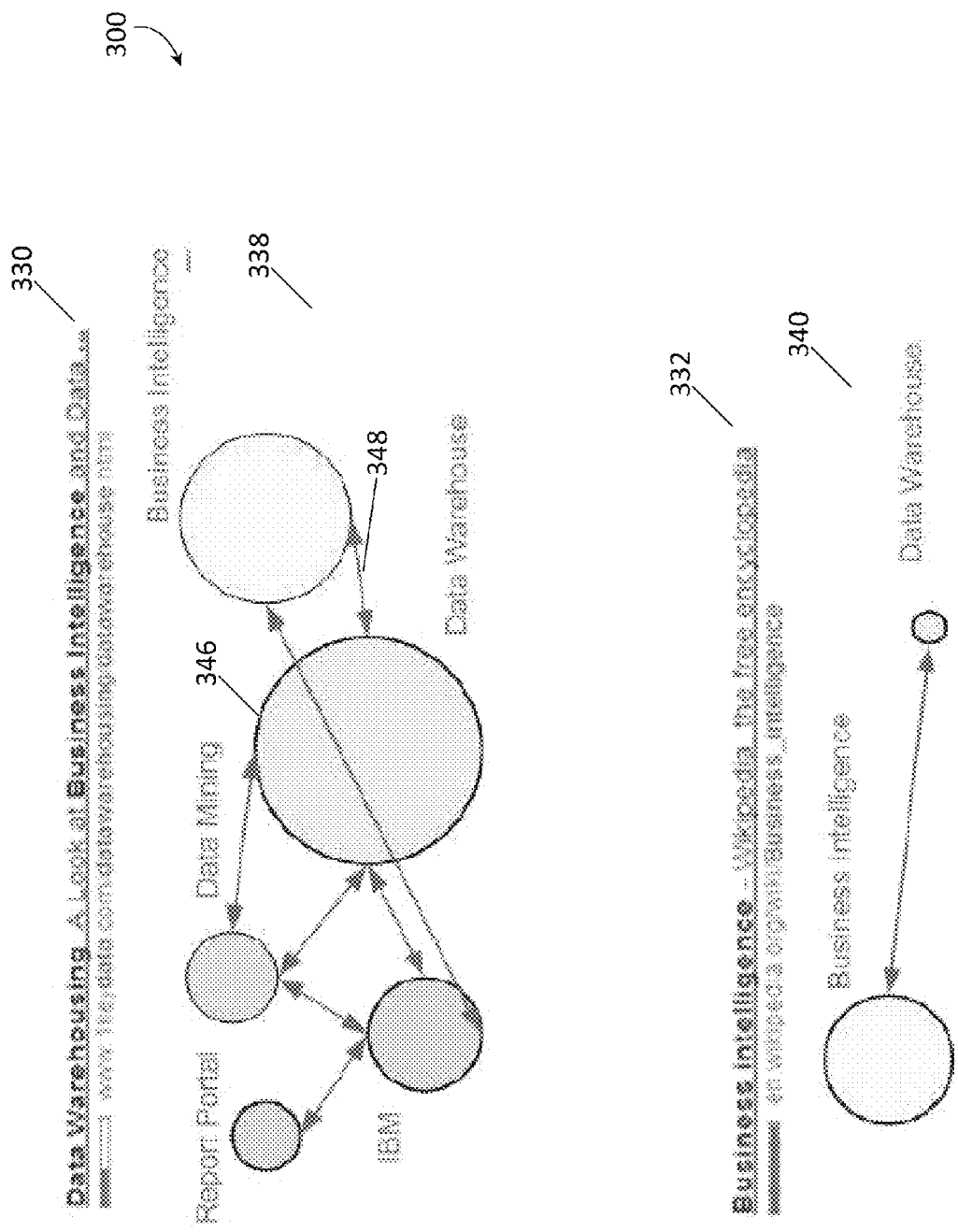
FIG. 4 is a pictorial representation of the example in FIG. 3, showing an enlarged view of two of the search results and respective first diagrams.
Figure 5:
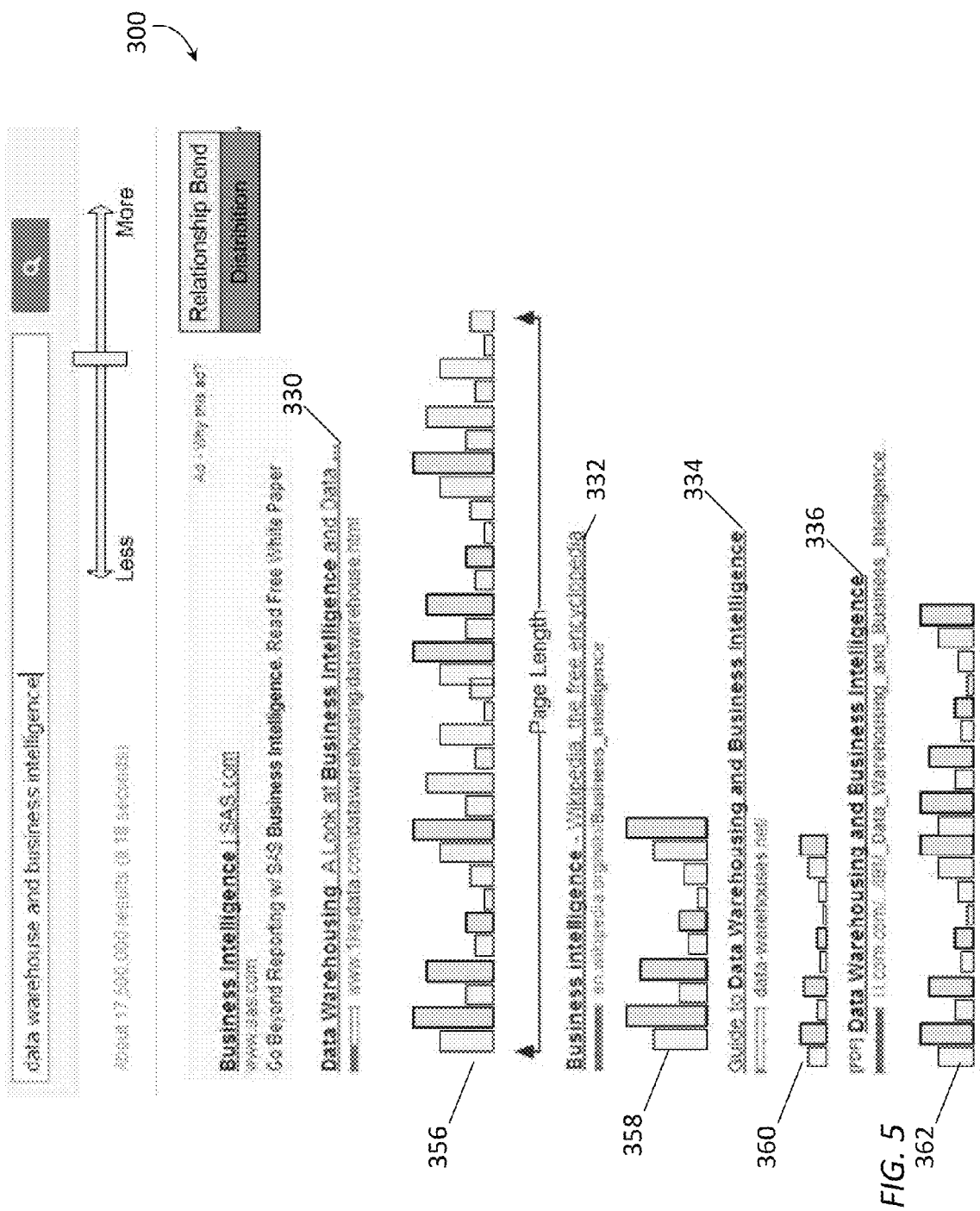
FIG. 5 is a pictorial representation of the example in FIG. 3, showing the list of search results and respective second diagrams.

Browser application 230 may present the plurality search results of the search on display 214. For example, browser application 230 may list the plurality of search results in display 214, wherein the first diagrams may be disposed directly under the respective search result. To provide a more detailed illustration of how search results and diagrams for each of the search results may be presented, we turn now to FIGS. 3-5. FIG. 3 provides an example list of search results and first diagrams that a user may see in response to entering: FIG. 4 provides an enlarged view of two of the search results and diagrams of FIG. 3. FIG. 5 provides an example list of search results and second diagrams.

FIGS. 3-5, depict a display having browser window or search window 300. The information presented in search window 300 may represent screen results presented to a user that has performed a search using an Internet search engine. For example, using text input box 305 the user may have entered numerous search terms, such as search term 310 ("data warehouse") and search term 315 ("business intelligence"), and clicked on the search button 320 to have the search engine performance its search. The bottom portion of search window 300 shows what may be numerous search results returned from the search engine for the specified search terms. The results section shows that the search engine may have returned three search hits or search results, namely search result 330, search result 332, search result 334, and search result 336.

Each of search result 330, search result 332, search result 334, and search result 336 have a first diagram 338, 340, 342, 344. The first diagram 338, 340, 342, 344 may include at least a first dimension. The first dimension may be based at least in part on a distribution of the first signifier and a distribution of the second signifier within the search result. A bond indicator may be used to show a bond strength among signifiers and may be based at least in part on the distribution of the signifiers in the document. The length of the bond indicator may show bond strength.

The first diagram may further include a second dimension, which may be based at least in part on a frequency of the first signifier and a frequency of the second signifier in the search result. For example, the second dimension may be displayed via a first icon. The size of the first icon may be representative of the frequency of the signifier in the search result. For example, the larger the first icon, the more often the signifier occurs in the search result.

Turning to FIG. 4, the signifiers of search result 330 illustrated in the first diagram 338 include "business intelligence, data warehouse, data mining, report portal and IBM." The signifiers of search result 332 illustrated in the first diagram 340 include "business intelligence and data warehouse." The signifiers "business intelligence" and "data warehouse" may be included because they are one or both of search term 310, 315 and/or keywords of the search result.

With respect to the first dimension of first diagram 338, a bond indicator 348 spanning between two of signifiers may illustrate the bond strength between the signifiers. As illustrated, "data warehouse" and "business intelligence" have a relatively strong bond strength as indicated by the relatively short length of the bond indicator 348.

With respect to the second dimension illustrated in first diagram 338, the size of a first icon 346 of first diagram 338 indicates that "Data warehouse" occurs the more often than "business intelligence." The search result 330 further touches on "data mining", "report portal", and "IBM".

The user may increase or decrease the number of signifiers in the first diagram via a slider 350. For example, the user may manipulate sliding bar 352. Search application 230 may increase or decrease the number of signifiers in the first diagram initially provided for the plurality of search results. Dynamically expanding or reducing the amount of signifier information available to the user in this manner may allow the user to determine which of the plurality of search results is relevant to him or her.

Additionally and/or alternatively, the user may change and/or switch between the display of signifier information to a second diagram via a button 354. As shown in FIG. 5, activation of the button 354 may present a second diagram 356, 358, 360, 362 for each of the plurality of search result 330, search result 332, search result 334, and search result 336. The second diagram 356, 358, 360, 362 may include at least a first dimension based at least in part on a distribution of the first signifier and a distribution of the second signifier within the search result. For example, the second diagram may indicate where along the length of the document, the signifier occurs. Accordingly, the first dimension may also include an indication of the frequency of the signifier.

Such additional context information being presented to the user in this dynamic fashion may allow the user to determine whether to actually click on the search result in order to visit the document and examine the document in more detail.

Figure 6:
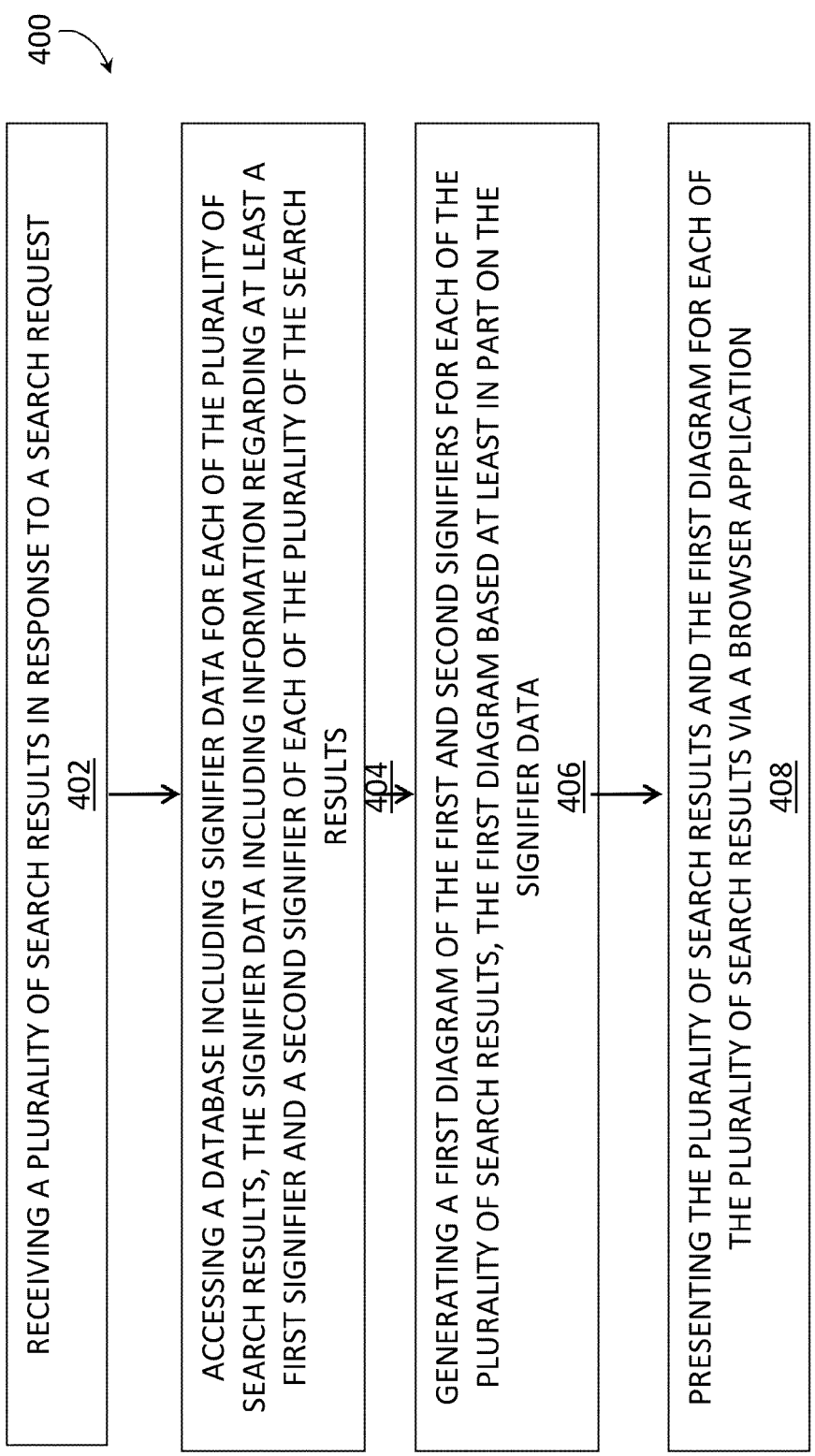
FIG. 6 is an example of a method of presentation of a plurality of search results and a diagram for each of the plurality of search results.

Referring now to FIG. 6, an example of a method 400, implemented in a computer system, of presentation of a plurality of search results and a diagram for each of the plurality of search results is provided. While FIG. 6 shows exemplary steps of a method according to one embodiment, other embodiments may omit, add to, and/or modify any of the steps shown in that figure. In step 402, a database including signifier data for each of the plurality of search results may be accessed. The signifier data may include information regarding at least a first signifier and a second signifier of each of the plurality of the search results. In step 404, a first diagram of the first and second signifiers may be generated for each of the plurality of search results. The first diagram may be based at least in part on the signifier data. In step 406, the plurality of search results and the first diagram for each of the plurality of search results may be presented via a browser application.

Method 400 may include other steps. For example, method 400 may include receiving an indication to increase or decrease the number of signifiers depicted in the first diagram. Additionally and/or alternatively, method 400 may include generating a second diagram for each of the plurality of search results, receiving an indication to display the second diagram and presenting the plurality of search results and the second diagram for each of the plurality of search results via the browser application.

In some embodiments of method 400, the search request may include at least a first search term and one of the first and second signifiers may include the first search term. Additionally and/or alternatively, each of the plurality of search results may include at least a first keyword and the other one of the first and second signifiers may include the first keyword. Additionally and/or alternatively, the plurality of search results may be generated by a search engine, and the signifier database may be stored at a search engine server. Additionally and/or alternatively, the signifier data may include a distribution of the first signifier and a distribution of the second signifier in the search result.

Figure 7:
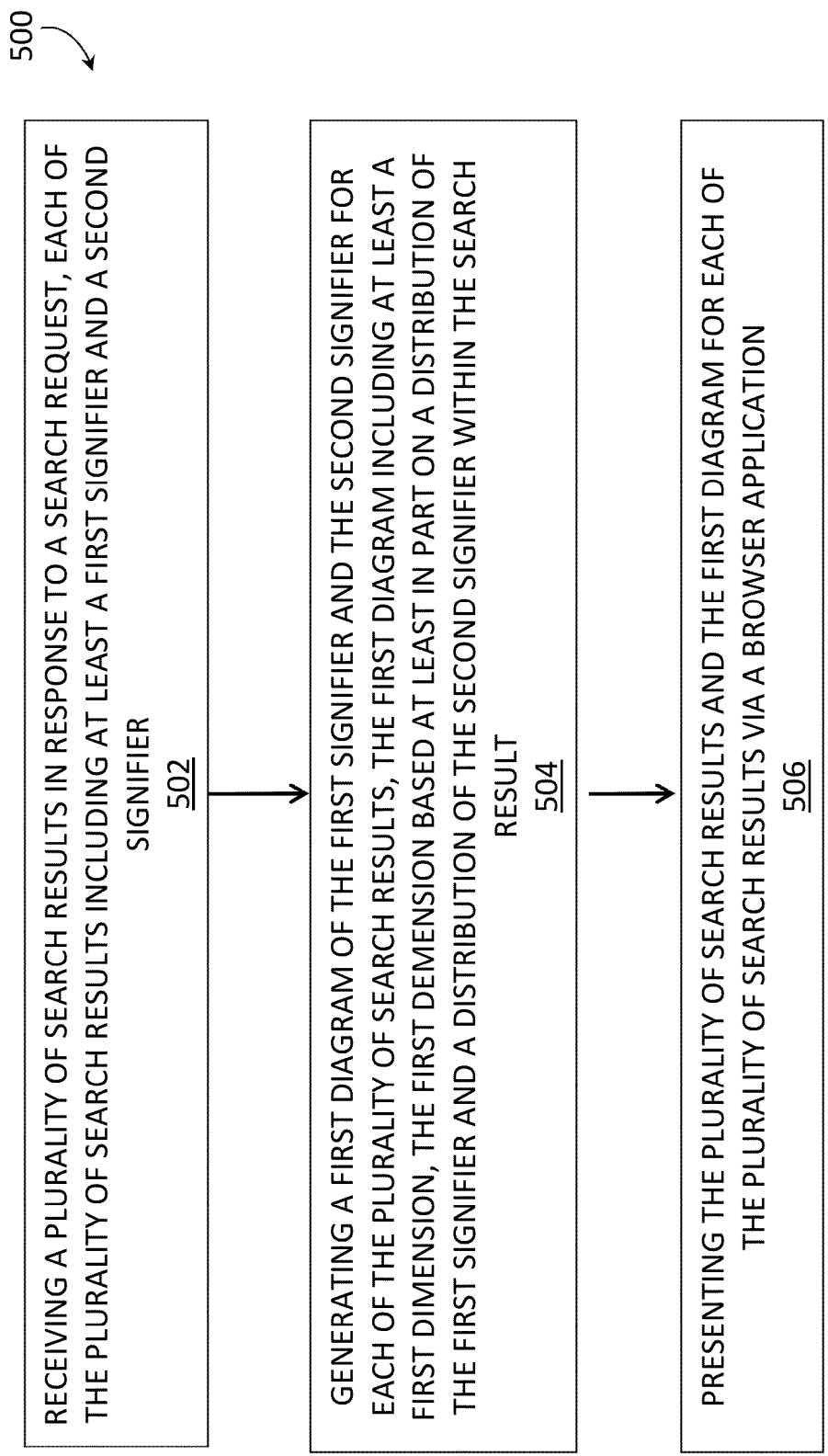
FIG. 7 is an example of a method of presentation of a plurality of search results and a diagram for each of the plurality of search results.

Referring now to FIG. 7, a further example of a method 500, implemented in a computer system, of presentation of a plurality of search results and a diagram for each of the plurality of search results is shown. While FIG. 7 shows exemplary steps of a method according to one embodiment, other embodiments may omit, add to, and/or modify any of the steps shown in that figure. In step 502, a plurality of search results may be received in response to a search request. Each of the plurality of search results may include at least a first signifier and a second signifier. In step 504, a first diagram of the first signifier and the second signifier may be generated for each of the plurality of search results. The first diagram may include at least a first dimension. The first dimension may be based at least in part on a distribution of the first signifier and a distribution of the second signifier within the search result. In step 506, the plurality of search results and the first diagram for each of the plurality of search results may be presented via a browser application.

Method 500 may include other steps. For example, method 500 may include receiving an indication to increase or decrease the number of signifiers in the first diagram. Additionally and/or alternatively, method 500 may include receiving an indication to display a second diagram and presenting the plurality of search results and the second diagram for each of the plurality of search results via the browser application.

Additionally and/or alternatively, in some embodiments of method 500, the first diagram may include a second dimension, the second dimension based at least in part on a frequency of the first signifier and a frequency of the second signifier in the search result. Additionally and/or alternatively, the first diagram may include a first icon, the size of the first icon based at least in part on the frequency of the first signifier in the search result, and a second icon, the size of the second icon based at least in part on the frequency of the second signifier in the search result. Additionally and/or alternatively, the first diagram may include a bond indicator to illustrate a bond strength between the first and second signifiers, the bond strength based at least in part on the distribution of the first signifier in the search result with respect to the distribution of the second signifier in the search result. Additionally and/or alternatively, the touch gesture information may include a touch gesture direction of movement towards or away from the data element. Additionally and/or alternatively, each of the plurality of search results may include at least a first keyword, and one of the first and second signifiers may include the first keyword. Additionally and/or alternatively, the search request may be based at least in part on a first search term, and one of the first signifier and the second signifier may include the first search term.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some embodiments of the present invention may additionally and/or alternatively be described as a method or system of graphical representation of information corresponding to keywords used in a search query for each of the search results obtained on executing the search query. For example, graphically depicting a distribution of keywords (in terms of frequency of occurrence) across each search result and/or graphically depicting keywords and their relationship for each of the search results.

Some embodiments of the present invention may additionally and/or alternatively be described as when a user performs a search with a search engine and a page of results are displayed, for each displayed hit, the invention may display a list of keywords from the web page and may graphically display information about the keywords, such as the size of a graphical element for a key word being a function on the number of times that the keyword is found on the page, as well as displaying relationships among the keywords. Additionally and/or alternatively, some embodiments of the present invention may be described as one or more of: graphically displaying the Keywords and the relationship among the Keywords, graphically displaying relationship strength among the Keywords, graphically displaying distribution of keywords in the entire page. In some embodiments, a user may increase the keywords and accordingly the new keywords and relationship (s) may be graphically displayed.

Some embodiments of the present invention may additionally and/or alternatively be described as follows: a search service provider server may extract keywords/phrases from each and every document (keyword extraction). The service provider server may derive the semantic relationship among the identified keywords. The semantic relationship may be identified based on ton or more text mining methods, e.g. association rule, decision tree etc. The count of each and every keyword may be identified and the size of the key word circle may be dependent on the count of the keyword. The above information may be pre-calculated and stored in the search service provider server. A user may provide a search query, and hit the search button. The search provider may identify the search results. For each and every of the search results, the keywords and keyword relationship may be identified. User may have the option to increase the keywords; this may be dependent on the count of keywords. The following information may be displayed: keyword circles, relationship among the keywords, and relationship strength among the keywords. User may change the display mode to "distribution" mode, in which the distribution of keywords in the entire document may be displayed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a plurality of search results in response to a search request;
   accessing a database including signifier data for each of the plurality of search results, the signifier data including information regarding at least a first signifier and a second signifier of each of the plurality of the search results;
   generating a plurality of first diagrams of the first and second signifiers, each of the plurality of first diagrams corresponding to one of the plurality of search results, each of the plurality of first diagrams based at least in part on the signifier data and comprising a first dimension based at least in part on a distribution of the first signifier and a distribution of the second signifier within the search result, a bond indicator, based at least in part on the distribution of the first signifier in the search result with respect to the distribution of the second signifier in the search result, that illustrates a bond strength between the first and second signifiers, and a second dimension based at least in part on a frequency of the first signifier and a frequency of the second signifier within the search result; and
   presenting the plurality of search results and the plurality of first diagram for each of the plurality of search results via a browser application.

2. The method of claim 1, wherein the search request includes at least a first search term, and one of the first and second signifiers includes the first search term.

3. The method of claim 2, wherein each of the plurality of search results includes at least a first keyword, and the other one of the first and second signifiers includes the first keyword.

4. The method of claim 1, further comprising receiving an indication to increase or decrease the number of signifiers depicted in the plurality of first diagrams.

5. The method of claim 1, further comprising:
   generating a second diagram for each of the plurality of search results;
   receiving an indication to display the second diagram; and
   presenting the plurality of search results and the second diagram for each of the plurality of search results via the browser application.

6. The method of claim 1, wherein the plurality of search results are generated by a search engine, and the signifier database is stored at a search engine server.

7. The method of claim 1, wherein the signifier data includes a distribution of the first signifier and a distribution of the second signifier in the search result.

8. A method comprising:
   receiving a plurality of search results in response to a search request, each of the plurality of search results including at least a first signifier and a second signifier;
   generating a plurality of first diagrams of the first signifier and the second signifier, each of the plurality of first diagrams corresponding to one of the plurality of search results, each of the plurality of first diagrams including at least a first dimension, the first dimension based at least in part on a distribution of the first signifier and a distribution of the second signifier within the search result and comprising a first dimension based at least in part on a distribution of the first signifier and a distribution of the second signifier within the search result, a bond indicator, based at least in part on the distribution of the first signifier in the search result with respect to the distribution of the second signifier in the search result, that illustrates a bond strength between the first and second signifiers, and a second dimension based at least in part on a frequency of the first signifier and a frequency of the second signifier within the search result; and
   presenting the plurality of search results and the plurality of first diagrams for each of the plurality of search results via a browser application.

9. The method of claim 8, wherein the plurality of first diagrams includes a second dimension, the second dimension based at least in part on a frequency of the first signifier and a frequency of the second signifier in the search result.

10. The method of claim 9, wherein each of the plurality of first diagrams includes a first icon, the size of the first icon based at least in part on the frequency of the first signifier in the search result, and a second icon, the size of the second icon based at least in part on the frequency of the second signifier in the search result.

11. The method of claim 10, wherein the bond strength based at least in part on the distribution of the first signifier in the search result with respect to the distribution of the second signifier in the search result.

12. The method of claim 8, wherein each of the plurality of search results includes at least a first keyword, and one of the first and second signifiers includes the first keyword.

13. The method of claim 8, wherein the search request is based at least in part on a first search term, and one of the first signifier and the second signifier includes the first search term.

14. The method of claim 8, further comprising receiving an indication to increase or decrease the number of signifiers in the plurality of first diagrams.

15. The method of claim 8, further comprising
    receiving an indication to display a second diagram; and
    presenting the plurality of search results and the second diagram for each of the plurality of search results via the browser application.

16. A computer program product comprising:
    at least one non-transitory computer readable storage medium having computer readable program code embodied therewith, the computer readable program code, when read by a processor, configured to:

receive a plurality of search results in response to a search request;

access a database including signifier data for each of the plurality of search results, the signifier data including information regarding at least a first signifier and a second signifier of each of the plurality of the search results;

generate a plurality of first diagrams of the first and second signifiers, each of the plurality of first diagrams corresponding to one of the plurality of search results, each of the plurality of first diagrams based at least in part on the signifier data and comprising a first dimension based at least in part on a distribution of the first signifier and a distribution of the second signifier within the search result, a bond indicator, based at least in part on the distribution of the first signifier in the search result with respect to the distribution of the second signifier in the search result, that illustrates a bond strength between the first and second signifiers, and a second dimension based at least in part on a frequency of the first signifier and a frequency of the second signifier within the search result; and present the plurality of search results and the plurality of first diagrams for each of the plurality of search results via a browser application.

17. The computer program product of claim 16, wherein the signifier data includes a distribution of the first signifier and a distribution of the second signifier in the search result.

18. The computer program product of claim 16 wherein the computer readable program code, when read by a processor, is further configured to:

receive an indication to increase or decrease the number of signifiers in the plurality of first diagrams.

19. A computer, comprising:
a processor;
a memory; and
a program including a plurality of instructions stored in the memory that are executed by the processor to:

receive a plurality of search results in response to a search request;

access a database including signifier data for each of the plurality of search results, the signifier data including information regarding at least a first signifier and a second signifier of each of the plurality of the search results;

generate a plurality of first diagrams of the first and second signifiers, each of the plurality of first diagrams corresponding to one of the plurality of search results, each of the plurality of first diagrams based at least in part on the signifier data and comprising a first dimension based at least in part on a distribution of the first signifier and a distribution of the second signifier within the search result, a bond indicator, based at least in part on the distribution of the first signifier in the search result with respect to the distribution of the second signifier in the search result, that illustrates a bond strength between the first and second signifiers, and a second dimension based at least in part on a frequency of the first signifier and a frequency of the second signifier within the search result; and present the plurality of search results and the plurality of first diagrams for each of the plurality of search results via a browser application.

20. The computer of claim 19, wherein
the signifier data includes a distribution of the first signifier and a distribution of the second signifier in the search result.

21. The computer of claim 19 wherein the plurality of instructions further includes instructions that are executed by the processor to:

receive an indication to increase or decrease the number of signifiers in the plurality of first diagrams.

22. The computer of claim 19 wherein the plurality of instructions further includes instructions that are executed by the processor to:

receive an indication to display a second diagram; and
present the plurality of search results and the second diagram for each of the plurality of search results via the browser application.

* * * * *